(12) United States Patent
Jhawar et al.

(10) Patent No.: US 11,494,472 B2
(45) Date of Patent: Nov. 8, 2022

(54) VOICE ACTIVATED AUTHENTICATION

(71) Applicant: RealWear, Inc., Vancouver, WA (US)

(72) Inventors: Sanjay Subir Jhawar, Menlo Park, CA (US); Tom Dollente, Milpitas, CA (US); Kenneth Lustig, Mercer Island, WA (US); Christopher Iain Parkinson, Richland, WA (US)

(73) Assignee: RealWear, Inc., Vancouver, WA (US)

( * ) Notice: Subject to any disclaimer, the term of this patent is extended or adjusted under 35 U.S.C. 154(b) by 641 days.

(21) Appl. No.: 16/508,641

(22) Filed: Jul. 11, 2019

(65) Prior Publication Data

US 2020/0019688 A1 Jan. 16, 2020

Related U.S. Application Data

(60) Provisional application No. 62/696,731, filed on Jul. 11, 2018.

(51) Int. Cl.
*G06F 21/00* (2013.01)
*G06F 21/32* (2013.01)
*G02B 27/01* (2006.01)
*G10L 17/24* (2013.01)

(52) U.S. Cl.
CPC .......... *G06F 21/32* (2013.01); *G02B 27/017* (2013.01); *G10L 17/24* (2013.01)

(58) Field of Classification Search
CPC ............. G06F 21/32; G06F 2221/2139; G02B 27/017; G10L 17/24; G10L 17/04; G10L 17/22
See application file for complete search history.

(56) References Cited

U.S. PATENT DOCUMENTS

| 10,019,561 | B1 * | 7/2018 | Shelton | H04L 63/105 |
| 11,019,090 | B1 * | 5/2021 | Smith | G06F 21/40 |
| 2004/0059922 | A1 * | 3/2004 | Harris | G10L 17/22 |
| | | | | 704/E17.015 |
| 2009/0150993 | A1 * | 6/2009 | Tilley | G06F 21/32 |
| | | | | 726/19 |
| 2014/0013405 | A1 * | 1/2014 | White | H04L 63/10 |
| | | | | 726/5 |
| 2014/0249817 | A1 * | 9/2014 | Hart | G06F 3/167 |
| | | | | 704/254 |

(Continued)

*Primary Examiner* — Jeffrey C Pwu
*Assistant Examiner* — William A Corum, Jr.
(74) *Attorney, Agent, or Firm* — Shook, Hardy & Bacon L.L.P.

(57) ABSTRACT

Systems and methods provide voice activated authentication over time. A user can be registered with a voice authentication system based on a voiceprint profile of common words. This user voiceprint profile can be used in an ongoing secondary authentication as a hands-free head-mounted wearable device is used over time. Upon a user logging into a hands-free head-mounted wearable device voiceprints can be collected during a session. These collected voiceprints can be compared with a user voiceprint profile for a user authorized to operate the hands-free head-mounted wearable device. Such a comparison can include an analysis of frequency, duration, and amplitude for the voiceprints. When the voiceprints match, the login of the user can be maintained based on this secondary authentication using the voiceprints matched to the user voiceprint profile.

15 Claims, 7 Drawing Sheets

(56) References Cited

U.S. PATENT DOCUMENTS

| | | | | |
|---|---|---|---|---|
| 2016/0292408 A1* | 10/2016 | Zhang | ............ | G06F 21/32 |
| 2018/0164594 A1* | 6/2018 | Lee | ............ | G02B 27/017 |
| 2018/0240463 A1* | 8/2018 | Perotti | ............ | G10L 17/22 |
| 2019/0000370 A1* | 1/2019 | Boshra | ............ | A61B 5/0064 |
| 2020/0065569 A1* | 2/2020 | Nduka | ............ | G02B 27/017 |

\* cited by examiner

VOICE ACTIVATED AUTHENTICATION

CROSS-REFERENCE TO RELATED APPLICATIONS

This application claims the benefit of U.S. provisional application 62/696,731, filed Jul. 11, 2018, entitled "Voice Activated Authentication", the entire contents of which are incorporated herein by reference as though fully set forth herein.

BACKGROUND

Oftentimes, it is desirable for user devices to be password protected such that a user must log into the device before the device can be used or data accessed using the device. Conventional authentication techniques for user devices include using a fingerprint, PIN, gestures, and/or face detection. However, such authentication techniques do not easily translate for use in authenticating wearable computing devices, such as a head-mounted wearable device. Head-mounted wearable devices can be configured for hands-free use, employing features based on detected voice command. Authenticating a head-mounted device using a PIN is problematic when the device is configured for hands-free use because saying a PIN out loud is not secure sign-in technique. Techniques have been developed in an attempt to overcome this deficiency. For instance, a display can be presented to a user indicating words assigned to numbers such that the user logs in using the words matched up with the numbers of their PIN. Another technique uses an enrolled voice print where a prompted phrase spoken by a user is matched with the user's enrolled profile. However, such authentication systems still results in the issue that once a user logs into the hands-free head-mounted device, the device remains logged in unless the user commands the device to sign out. As such, after the initial user authentication, the head-mounted device is essentially an open device allowing individuals other than the logged-in user to utilize the device.

SUMMARY

Embodiments of the present disclosure are directed towards techniques that allows a user to log into a hands-free head-mounted device using voice activated authentication such that the device remains secure over time. In particular, embodiments of the present invention are generally directed toward systems, methods, and computer storage media for providing improved login that allows a user to log into a head-mounted device using an initial voice activated authentication where security is maintained over time using secondary authentication and other safeguards to ensure authorized access and user of the device.

A voice authentication system can utilize an initial authentication process to allow a user to gain access to the functionality of a hands-free head-mounted wearable device. Secondary authentication can be used to maintain security of the device as it is used over a time period. An authorized user can be registered with such a system by generating a user voiceprint profile comprised of voiceprints for very common words, or common words (e.g., words/phrases a user of the device often speaks when using a device). This user voiceprint profile can be compared with voiceprints collected during a session using the hands-free head-mounted wearable device. The comparison can be based on matching frequency, duration, and amplitude of the collected voiceprints and the voiceprints in the user profile. As voiceprints are often unique to an individual based on how the individual utters a particular word/phrase, the comparison ensures that an authorized user is still the individual using the hands-free head-mounted wearable device. If the voiceprints do not match, the user can be logged out of the device. Further, the voice authentication system can utilize additional security policies to ensure the protection of a hands-free head-mounted wearable device.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various mobile devices or wearable computing devices have limitations with respect the security of logging in when using a hands-free mode. More specifically, using conventional authentication techniques such as using a fingerprint, PIN, gestures, and/or face detection do not easily translate for use in authenticating wearable computing devices, such as a head-mounted wearable device. For instance, authenticating a head-mounted device using a PIN is problematic because saying a PIN out loud is not secure sign-in technique. As such, a voice authentication system can utilize an initial authentication process to allow a user to gain access to the functionality of a hands-free head-mounted wearable device and a secondary authentication to maintain security of the device over a time as the device is used. An authorized user can be registered with such a system by generating a user voiceprint profile comprised of voiceprints for very common words, or common words (e.g., words/phrases a user of the device typically speaks when using a device). This user voiceprint profile can be compared with voiceprints collected during a session using the hands-free head-mounted wearable device. The comparison can be based on matching frequency, duration, and amplitude of the collected voiceprints and the voiceprints in the user profile. As voiceprints are often unique to an individual based on how the individual utters a particular word/phrase, the comparison ensures that an authorized user is still the individual using the hands-free head-mounted wearable device. If the voiceprints do not match, the user can be logged out of the device. Further, the voice authentication system can utilize additional security policies to ensure the protection of a hands-free head-mounted wearable device Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Figure 1:
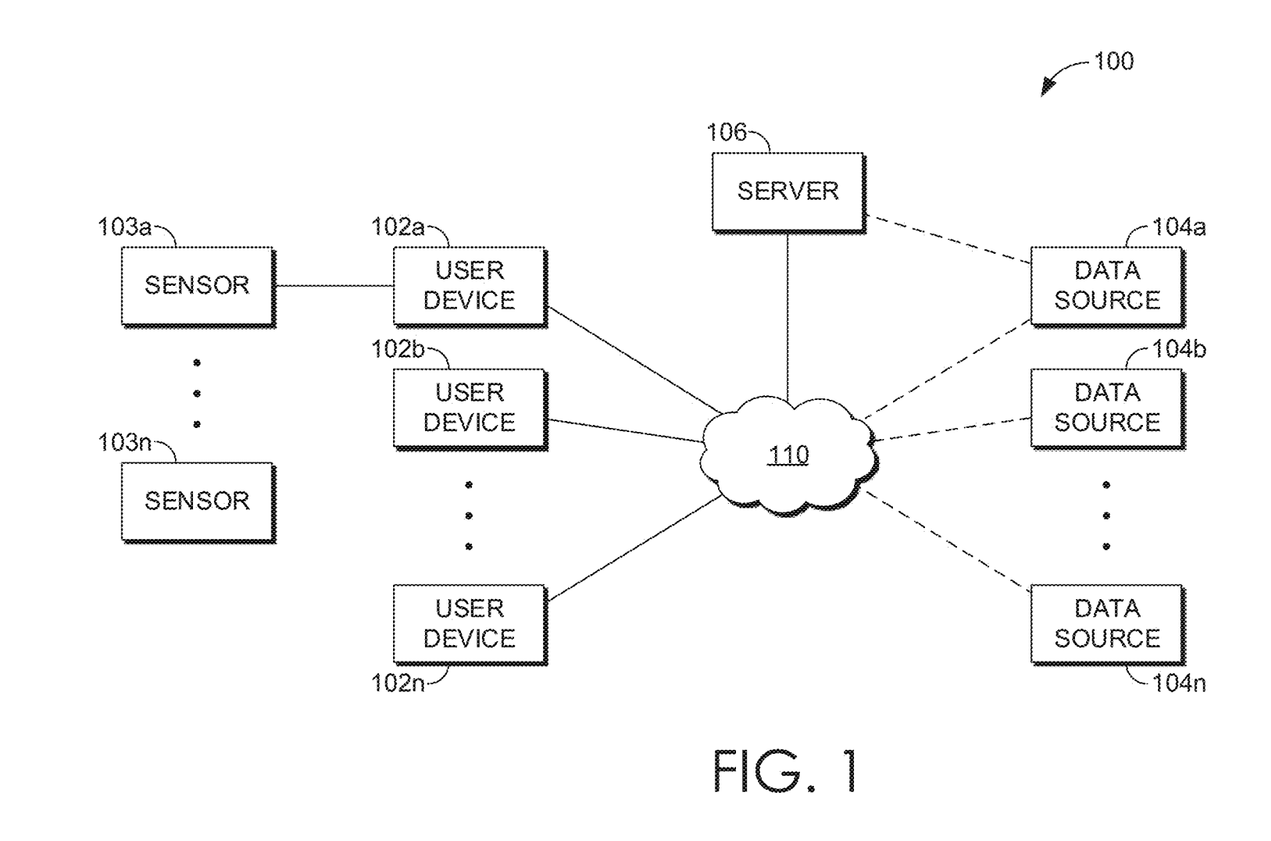
FIG. 1 is a block diagram illustrating an exemplary operating environment 100 in which some embodiments of the present disclosure may be employed.

Among other components not shown, example operating environment 100 includes a number of user devices, such as user devices 102a-102n; a number of data sources, such as data sources 104a and 104b through 104n; server 106; sensors 103a-103n, and network 110. It should be understood that environment 100 shown in FIG. 1 is an example of one suitable operating environment. Each of the components shown in FIG. 1 may be implemented via any type of computing device, such as computing device 700, described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 maybe provided via multiple devices arranged in a distributed environment that collectively provide the functionality described herein. Additionally, other components not shown may also be included within the distributed environment.

User devices 102a-102n may comprise any type of computing device capable of use by a user. For example, in one embodiment, user devices 102a-102n may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, a camera, remote control, a bar code scanner, a computerized measuring device, appliance, consumer electronic device, a workstation, a head-mounted computing device, or any combination of these delineated devices, or any other suitable device.

User devices 102a-102n can be client devices on the client-side of operating environment 100, while server 106 can be on the server-side of operating environment 100. Server 106 can comprise server-side software designed to work in conjunction with client-side software on user devices 102a-102n so as to implement any combination of the features and functionalities discussed in the present disclosure. This division of operating environment 100 is provided to illustrate one example of a suitable environment, and there is no requirement for each implementation that any combination of server 106 and user devices 102a-102n remain as separate entities.

Data sources 104a and 104b through 104n may comprise data sources and/or data systems, which are configured to make data available to any of the various constituents of operating environment 100, or hands-free interaction system 200 described in connection to FIG. 2. For instance, in one embodiment, one or more data sources 104a through 104n provide (or make available for accessing) storage 270 of FIG. 2. Data sources 104a and 104b through 104n may be discrete from user devices 102a-102n and server 106 or may be incorporated and/or integrated therewith. In one embodiment, one or more of data sources 104a though 104n comprises one or more sensors, which may be integrated into or associated with one or more of the user devices 102a-102n or server 106. Operating environment 100 can be utilized to implement one or more of the components of hands-free interaction system 200, described in FIGS. 2 and 3, including components for motion processing, sound processing, and data storage such as keyword custom libraries, user data, and context specific data.

Figure 2:
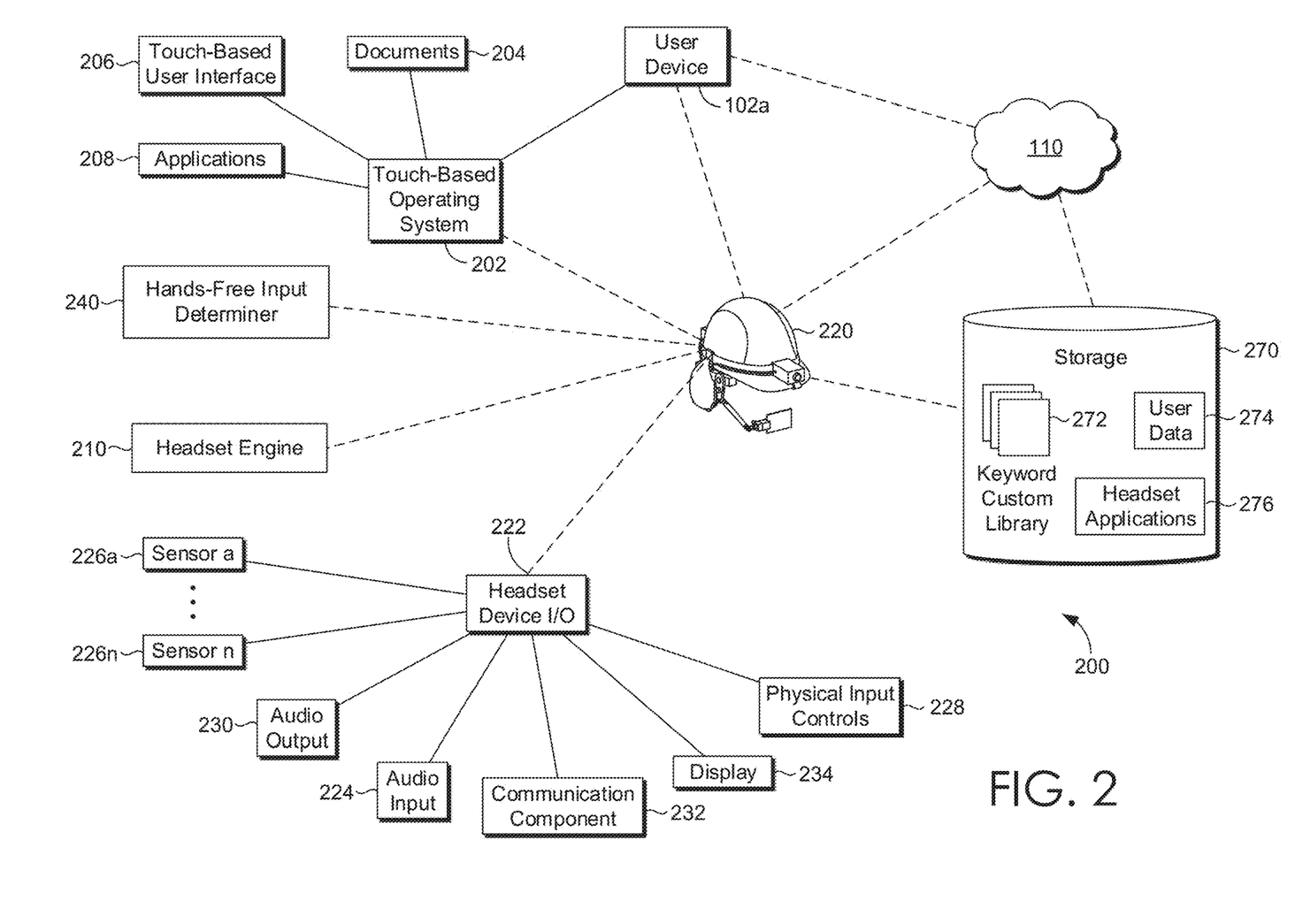
FIG. 2 is a block diagram illustrating an illustrating an exemplary embodiment of hands-free interaction system, in accordance with some implementations of the present disclosure.

Turning now to FIG. 2, a block diagram is provided illustrating an exemplary embodiment of hands-free interaction system 200 in which some embodiments of the present disclosure may be employed. Hands-free interaction system 200 generally operates to facilitate hands-free interaction with applications and features of a touch-based operating system 202. It should be understood that the hands-free interaction system 200 shown in FIG. 2 is an example of one system in which embodiments of the present disclosure may be employed. Each component shown may include one or more computing devices similar to the operating environment 100 described with reference to FIG. 1. The hands-free interaction system 200 should not be interpreted as having any dependency or requirement related to any single module/component or combination of modules/components illustrated therein. For instance, hands-free interaction system 200 may comprise multiple devices arranged in a distributed environment that collectively provide the functionality described herein. It should be understood that the hands-free interaction system 200 and/or its various components may be located anywhere in accordance with various embodiments of the present disclosure.

Head-mounted computing device 220 (described in more detail with reference to FIG. 3) generally facilitates hands-free interaction with a touch-based user interface 206 of a touch-based operating system 202. The head-mounted computing device 220 may comprise a variety of headset device input and output components, such as motion and audio sensors, displays, and input controls, among others. Additionally, the head-mounted computing device 220 may include computer-usable instructions stored on computer storage media, such as storage 270. Accordingly, the head-mounted computing device 220 may be configured to execute computing processes that may be performed using any combination of hardware, firmware, and/or software. For instance, various functions may be carried out by a processor (e.g., headset processor 280) executing instructions stored in memory. The methods may be provided by a standalone application, a service or hosted service (standalone or in combination with another hosted service), or a plug-in to another product, to name a few.

The functions and processes performed by the hands-free interaction system 200 may be associated with applications, services, or routines (such as headset applications 276). In particular, such applications, services, or routines may operate on the head-mounted computing device 220, or may be distributed across multiple devices. For example, the functions and processes described herein may execute on a touch-based user device (such as user device 102*a*), servers (such as server 106), or be implemented in the cloud. Moreover, in some embodiments the components of hands-free interaction system 200 may be distributed across the network 110. Additionally, these components, functions performed by these components, or services carried out by these components, may be implemented at appropriate abstraction layer(s), such as the operating system layer, application layer, hardware layer, etc., of the computing system(s). Alternatively, or in addition, the functionality of these components and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regard to specific components shown in example hands-free interaction system 200, it is contemplated that in some embodiments functionality of these components can be shared or distributed across other components.

Accordingly, head-mounted computing device 220, may include one or more headset processors 280 that execute instructions (which may be stored by headset applications 276) for providing a hand-free interaction mode. The hands-free interaction mode may facilitate interaction with programs, applications, and features of the touch-based operating system 202 via the head-mounted computing device 220. In one aspect, the headset applications 276 include instructions for facilitating hands-free interaction with existing binary applications (such as applications 208), that operate in touch-based operating system 202. For example, the hands-free interaction system 200 may be configured for use with any number of applications, via native or existing binaries, such as applications available from the Playstore, Appstore, and any other source of touch-based applications. Further, a headset engine 210 may interrogate applications 208 running on the touch-based operating system 202 to determine screen components/features, such as such input controls, form elements, and navigation commands, among others, included in a touch-based user interface 206. For instance, the headset engine 210 may analyze the user interface layer of the touch-based operating system 202 to determine when various screen components/features are being provided for display. In this way, as a touch-based application is being executed, various displayed UI components of the application can be determined. The screen components/features may then be extracted or identified, and provided to the other components of hands-free interaction system 200 for processing, as will be described. As a result, virtually any application that is operable with touch-based operating system 202 may be enabled for hands-free interaction, at runtime. Additionally, the hands-free interaction system 200 may include XML files for applications that are not compatible with standard hands-free interaction mode instructions. The XML, files may override the standard hands-free interaction mode instructions, and provide customized instructions. Additionally, the XML files may be merged with existing binaries of the applications 208 at runtime so that the existing binaries do not need to be modified.

Further, the head-mounted computing device 220 may include various headset device I/O 222, components, which may, for example, sense or detect hands-free inputs received via head-mounted computing device 220. The received inputs may be processed, for example, by hands-free input determiner 240, to generate one or more hands-free commands. Further, the hands-free interaction system 200 may be configured to determine and/or generate commands associated with received hands-free inputs. The generated hands-free commands may be communicated (for example, by a communication component 232) to the touch-based operating system 202 for execution. The determined commands may programmatically instruct the touch-based operating system 202 to execute the commands, as if it were executing corresponding touch-based inputs.

Headset engine 210 is generally responsible for facilitating communication between touch-based operating system 202, touch-based user interface 206, motion processing system 242, sound processing system 250, interface analyzer 212, storage 270, headset device input/output (I/O) 222, and their respective subcomponents. In some aspects, headset engine 210 initializes the hands-free interaction mode in response to receiving a signal from headset device I/O 222. For example, physical input control(s) 238 (such as a button, switch, or the like) may receive input that initializes the hands-free interaction mode. In some aspects, headset engine 210 also initializes the analysis of the touch-based user interface 206 and/or touch-based operating system 202, such that touch-based scrolling features and touch-based control dialogues determined. In some aspects, headset engine 210 receives motion data (e.g., from sensors 226*a*-226*n*) and transmits the information hands-free input determiner 240. In some aspects, headset engine 210 receives audio input 224 from headset device I/O 222 and transmits the information to hands-free input determiner 240.

Touch-based user interface 206 generally facilitates user interaction with the touch-based operating system 202 in the hands-free interaction system 200. In some aspects, the touch-based user interface 206 may comprise touch-based scrolling features (such as "swipe" features, horizontal scroll bars, vertical scroll bars, and the like). In some aspects, the touch-based user interface 206 comprise touch-based control dialogues (such as text boxes or fields, check boxes, application icons, document tools, radio buttons, and the like, for example).

In aspects, storage 270 may include a keyword custom library 272. The keyword custom library 272 may comprise a database containing keyword cue to touch-based control dialogue associations. In aspects, storage 270 may also comprise user specific settings, preferences, thresholds, permissions, or any data associated with an individual or group of individuals. In aspects, storage 270 may headset applications 276. Storage 270 may be communicatively coupled with the any of the components and subcomponents of hands-free interaction system 200.

Audio input 224 generally refers to components for capturing audio, such as microphones and the like (e.g. directional and omnidirectional microphones). In embodiments, audio input 224 may comprise multiple microphones located at various points of head-mounted computing device 220 configured such that ambient noise may be captured and ultimately used to aid in processing and analysis of user audio inputs. It will be understood that audio input 224 may be any sensor or system of sensors capable of perceiving audio input and converting audio input into an audio feed without departing from the scope of this disclosure. Audio output 230 generally facilitates sound output to the user. It will be understood that any audio output component or components capable of producing sound in response to electrical input (such as a speaker) may be used in embodiments without departing from the scope of this disclosure. In embodiments, audio output 230 may be configured to communicate with at least headset device I/O 222. Communication component 232 generally facilitates communication between the head-mounted computing device 220 and other devices through any suitable communication protocol. In embodiments, communication component may comprise a wireless communication system discussed above or below with reference to FIG. 7.

Display 234 generally facilitates a visual presentation of data to the user. It will be understood that any display may be used in various embodiments without departing from the scope of this disclosure. Sensors 226a-226n may include cameras, microphones, GPS, RFID sensors, infrared sensors, light sensors, magnetometers, gyroscopes, capacitive transducers, potentiometers, resistive transducers, synchros, accelerometers, and micro-gyroscopes, among others. Such sensors can be used to monitor user interaction with the display.

Figure 3:
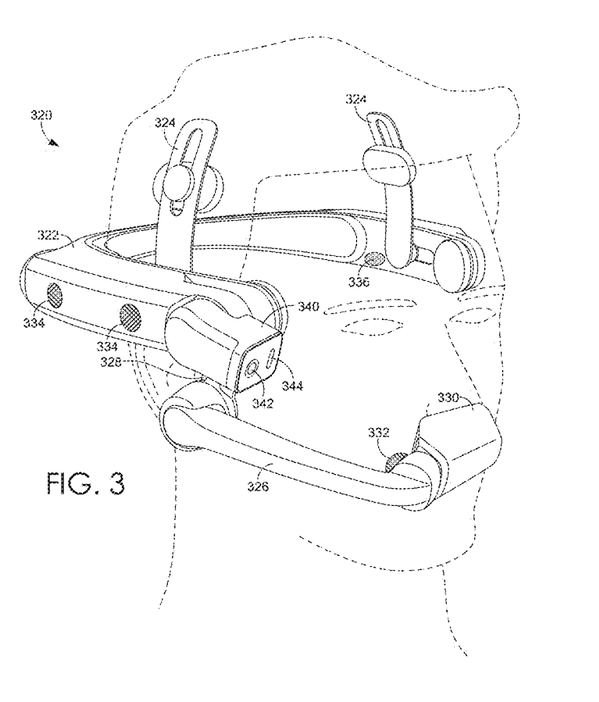
FIG. 3 is an illustration of an exemplary head-mounted display device, in accordance with some implementations of the present disclosure.

FIG. 3 shows an exemplary embodiment of a hands-free head-mounted wearable device 320, in accordance with some implementations of the present disclosure. Hands-free head-mounted wearable device 320 is a wearable device and may include similar features to that of computing device 700 of FIG. 7. Hands-free head-mounted wearable device 320 may also be similar to head-mounted wearable device 220 of FIG. 2. Hands-free head-mounted wearable device 320 includes a frame member 322. Frame member 322 may be a frame structure. As shown in FIG. 3, frame member 322 is configured and arranged for wearing by a user. For instance, frame member 322 may be worn about the user's head. Hands-free head-mounted wearable device 320 may additionally include one or more stabilizing members 324 (or stabilizing structures) that stabilize the frame member 322 about the user's head.

Hands-free head-mounted wearable device 320 may include one or more rotating members, such as but not limited to first rotating member 326 and second rotating member 328. At least one rotating members 326 or 328 is rotatably coupled to frame member 322, i.e. at least one of rotating members 326 or 328 is coupled to frame member and configured and arranged for rotating relative to frame member 322. In at least one embodiment, first rotating member 326 may be a boom arm that is coupled to a display module 330. Display module 330 houses a display device (not shown in FIG. 3) that is directed towards the eyes of the users. As shown in FIG. 3, the display device is within the user's line-of-sight (LOS). A user may re-position the display device, via a rotation of one or more of rotating members 326/328, such the display device is excluded from the user's LOS. Note that in the view of hands-free head-mounted wearable device 320 shown in FIG. 3, the display device is occluded by external surfaces display module 330.

Hands-free head-mounted wearable device 320 includes various electroacoustic transducers (e.g. microphones and audio speakers). One such electro acoustic transducer 332 is located near a distal end of rotating member 326. Electroacoustic transducer 332 may be a primary microphone. In various embodiments, hands-free head-mounted wearable device 320 includes one or other electroacoustic transducers, including but not limited to one or more auxiliary microphones 334 and one or more audio speakers, such as but not limited to audio speaker 336.

Hands-free head-mounted wearable device 320 may include an optical module 340 that houses one or more photon-detectors (e.g. camera devices), such as photon-detector 342 and a projection system 344. Projection system 344 may include one or more photon-emitters (e.g. scanning lasers, scanning light emitting diodes (LED), and the like). Optical module 340 may be configured and arranged to rotate relative to frame member 322, such that the field-of-view (FOV) of the photon-detector 342 may be rotationally varied. In at least some rotational orientations of optical module 340, the FOV of photon-detector 342 is at least similar to the FOV of the user.

In accordance with the some of the described embodiments, with brief reference back to FIG. 3, the hands-free head-mounted wearable 320 includes a primary microphone 332 that can be employed to receive audio data from the user, among other things. While it is contemplated that any one or more microphones, disclosed or not described, can be employed to receive audio data from the user, by the computing device in accordance with the described embodiments, the primary microphone 332 is utilized herein for descriptive purposes, and as an exemplary input device (e.g., microphone) for the reception of audio signals from the user, and to the audio input resource (e.g., audio input component). Also, while not depicted by the illustrated embodiments, the audio input component can include any hardware component that receives audio input signals from a coupled audio input device (e.g., a microphone or audio source). For instance, an audio input component can include any audio input interface, such as an audio card having any number of audio inputs (e.g., auxiliary jacks, USB jacks, optical inputs, wireless inputs), a wireless audio card (e.g., Bluetooth, Wi-Fi), or an integrated audio controller (e.g., integrated into a CPU or motherboard). Also in accordance with the described embodiments, the microphone is coupled (e.g., directly or wirelessly) to the audio input component, such that the microphone can receive raw audio signals, which are communicated to the audio input component, where they are processed and encoded into audio data.

Figure 4:
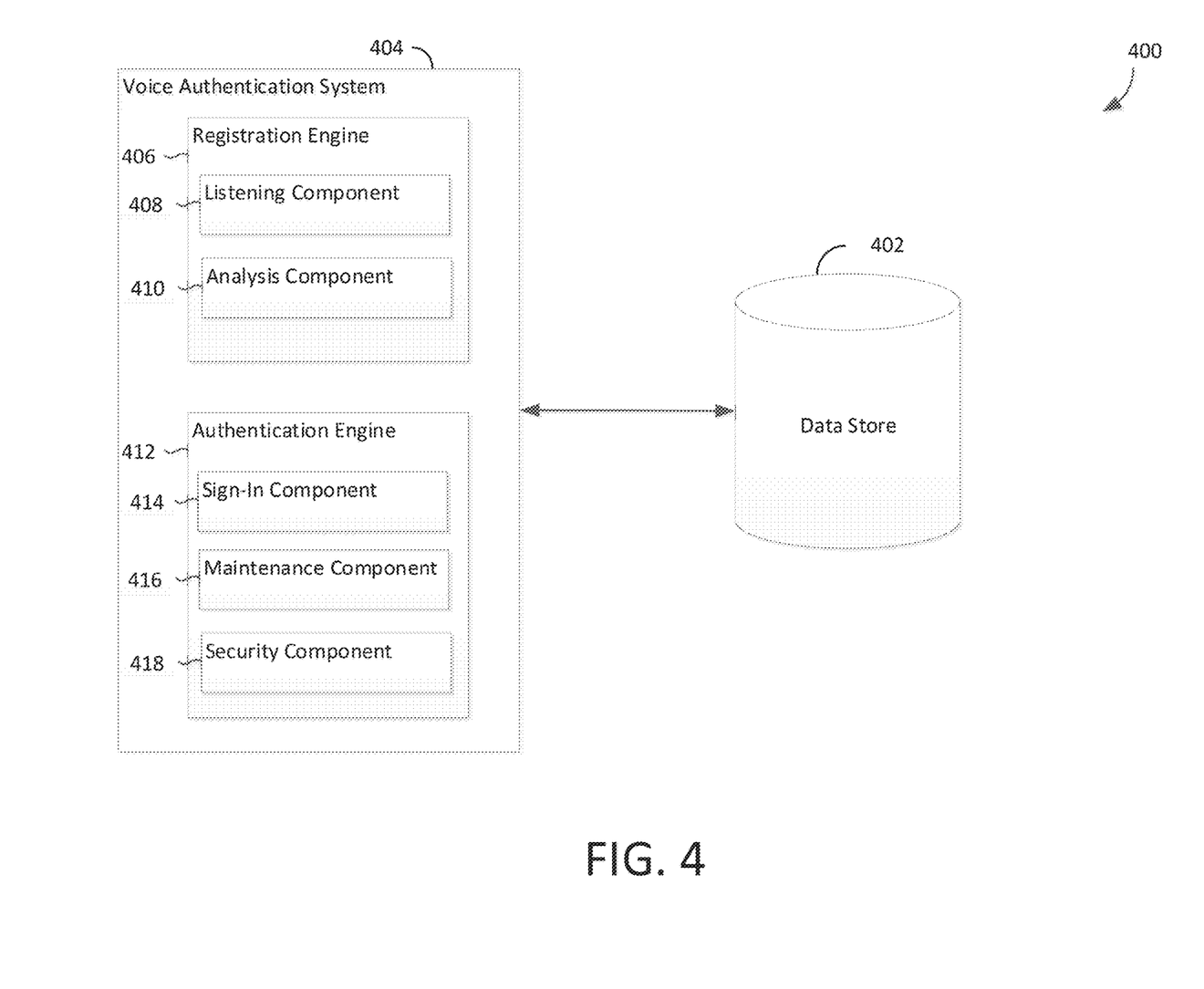
FIG. 4 is an illustration of an exemplary voice activated authentication environment for a hands-free head-mounted wearable device, in accordance with some implementations of the present disclosure.

Referring to FIG. 4, aspects of an illustrative voice activated authentication environment 400 for a hands-free head-mounted wearable device are shown, in accordance with various embodiments of the present disclosure. As depicted in FIG. 4, voice authentication system 404 includes registration engine 406 and authentication engine 412. The foregoing engines of voice authentication system 404 can be implemented, for example, in operating environment 100 of FIG. 1 and/or operating environment 200 of FIG. 2. In particular, those engines may be integrated into any suitable combination of user devices 102a and 102b through 102n and server(s) 106 of FIG. 1. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the voice authentication system.

As shown, a voice authentication system can operate in conjunction with data store 402. Data store 402 can store computer instructions (e.g., software program instructions, routines, or services), data, and/or models used in embodiments described herein. In some implementations, data store 402 can store information or data received via the various engines and/or components of voice authentication system 404 and provide the engines and/or components with access to that information or data, as needed. Although depicted as a single component, data store 402 may be embodied as one or more data stores. Further, the information in data store 402 may be distributed in any suitable manner across one or more data stores for storage (which may be hosted externally). In embodiments, such data can be input into data store 402 from a remote device, such as from a server or another user device.

In embodiments, data stored in data store 402 can include login information for a user(s), voice profile(s) of an authorized device user(s), headset security policies, etc. Login information can generally include a PIN, password, and/or passcode for registered device users. Voiceprint profiles can generally be defined as recorded words and/or phrased with a particular frequency, duration, and amplitude. Such voiceprints can be unique to an individual based on how the individual utters a particular word/phrase. A voice profile of an authorized device user can include voiceprints for very common words or common words (e.g., words/phrases a user of the device often speaks when using a device). Headset security policies can also be stored including security measures for a hands-free head-mounted wearable device that create another layer of security beyond initial or secondary voice authentication. In some cases, data can be received by voice authentication system 404 from one or more user devices (e.g., a hands-free head-mounted wearable device). In other cases, data can be received from one or more data stores in the cloud.

A voice authentication system can generally be used for authenticating a user of a headset. Specifically, voice authentication system 404 can utilize an initial sign-in process as well as a secondary authentication that maintains security of a headset. Further, the voice authentication system can utilize additional security policies to ensure the protection of a hands-free head-mounted wearable device. In this way, the voice authentication system can allow an authorized user to log into a device using some form of authentication. As the user continues to use the device, the authentication can be maintained using an ongoing secondary authentication to verify the user of the device matches an authorized user (e.g., based on matching voiceprint profiles). Such a voice authentication system can have further security measures. One such security measure can be that of the hands-free head-mounted wearable device is detected to not be on the body of a user, the device is logged out and/or the device is locked. Another security measure can be that a user's authorized voiceprint profile used to log the user into the hands-free head-mounted wearable device can expire after a predefined number of sign-ins if the device fails to connect to a cloud implemented device check-in. In this way, this security feature results in a hybrid local and cloud-based voice authentication system.

Registration engine 406 can be used to register an authorized user into a voice authentication system by generating a user voiceprint profile. As depicted in FIG. 4, registration engine 406 can utilize listening component 408 and analysis component 410 to generate the user voiceprint profile during registration of the user. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by a system separate from the facial recognition system.

Listening component 408 can be used to collect voiceprints of a user during use of a hands-free head-mounted wearable device. To generate a voiceprint profile, the headset can listen to a user interacting with the device. In listening, voiceprints from a user can be collected. A voiceprint can generally refer to an analysis of a recording of a user's speech with respect to frequency, duration, and amplitude. A voiceprint can further be based on very common words for a user (e.g., words/phrases often uttered by the user).

Such collection can occur during a single session and/or over time. For instance, a user can undergo registration during an initial use of the headset. In other embodiments, a user can undergo registration over multiple uses of the headset to obtain a more personalized voiceprint profile. Collected voiceprints can include a recording of an entire user session with the device. Alternatively, or in addition, collected voiceprints can be random samplings from a user session(s).

Analysis component 410 can be used to analyze collected voiceprints (e.g., voiceprints collected using listening component 408) to generate a user voiceprint profile that can be used to register the user in a voice authentication system. Such a user voiceprint profile can be based on very common words for a user. Very common words can generally be defined as often used words and/or phrases by a particular user. For instance, a first user's very common words can include "job order" and "open documents," whereas a second user's very common words can include "navigate back" and "navigate home." A user's very common words can be determined by analyzing collected voiceprints for a user and selecting a predetermined number of very common words to use as a profile for the user (e.g., top 10 most uttered words/phrases). In embodiments, a user voiceprint profile can be dynamically updated over time such that the very common words are constantly tailored to a particular user. Such dynamic updating can occur over at determined time instances such that the user voiceprint profile can be up-to-date as a user's work and/or use of the hands-free head-mounted wearable device changes over time.

Upon generating a user voiceprint profile based on very common words, the profile can be stored in an authentication database. Such a database can be stored, for example, in data store 402. In some embodiments, a voiceprint profile can be designated for a particular hands-free head-mounted wearable device. Alternatively, a voiceprint profile can be designated for a particular user, allowing the user to log into any authorized hands-free head-mounted wearable device. This voiceprint profile can be stored locally on a hands-free head-mounted wearable device and/or on a server in the cloud.

As depicted in FIG. 4, authentication engine 412 can utilize sign-in component 414, maintenance component 416, and security component 418 to authenticate a user to allow user of a hands-free head-mounted wearable device. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by a system separate from the facial recognition system.

Once a user is registered in the voice authentication system, the user will be able to log into the device. Authentication engine 412 can be used to perform an initial sign into a device, maintain the login of a user for the device, and utilize additional security features to ensure protection of the device over time.

Sign-in component 414 can be used to initially authenticate a user during sign-in. It should be appreciated that any login technique can be used for a user to sign into a hands-free head-mounted wearable device. For instance, a display of the hands-free head-mounted wearable device can be presented to a user with words assigned to numbers. The user is able to use the word associations such that the user can log into the device in using words matched up with the numbers of their PIN. Another technique allows a user to speak a prompted phrase that is then matched with the user's enrolled profile. For instance, a user can be prompted to speak their full name and then the sound, cadence, etc. of the spoken name can be compared with the user's stored name profile.

Maintenance component 408 can be used to perform ongoing secondary authentication of a user logged into a hands-free head-mounted wearable device. Secondary authentication can take place at designated time intervals during use of a device (e.g., every 15 minutes, every hour, every three hours, etc.). Advantageously, secondary authentication ensures that as a hands-free head-mounted wearable device is used for extended periods of time, the individual using the device is the same user that performed the initial authentication. Alternatively, the secondary authentication can ensure that if a new individual is using the device, the new individual is also authorized to use the device.

Secondary authentication can collect voiceprints of a user of a hands-free head-mounted wearable device. These collected voiceprints can be random samplings taken during use of the device. The collected voiceprints can be compared with one or more registered user voiceprint profiles (e.g., stored in data store 402). Specifically, the comparison between the collected voiceprints and the registered user voiceprint profiles can focus on very common words in the user voiceprint profiles. In this way, the maintenance component can perform a secondary authentication, allowing a user to continue using a device, when the phrases being uttered by the user match a registered user voiceprint profile.

For instance, when a user's very common words in the registered user voiceprint profile include "job order", "gotta get going", "open documents", "navigate back", and "navigate home" and the user of the device continues to use these phrases, the maintenance component can allow the secondary authentication.

Security component 418 can be used to implement additional security measures for a hands-free head-mounted wearable device. Advantageously, adding such security measures creates another layer of security beyond voice authentication. Such security measures can be executed using policies that can be adjusted based on needs. For instance, security measures in one working environment can differ from another working environment which can differ from a home environment or public environment.

One security measure can be that if the hands-free head-mounted wearable device is detected to not be on the body of a user, the device can logged out and/or the device is locked. This detection can be determined using sensors of the device such that if the device remains still for an amount of time, a determination is made that the device is not on the body of a user. Upon logging out and/or locking the device, a user can be required to perform a new initial authentication using, for example, sign-in component 414.

Another security measure can be that access using a user's voiceprint profile can expire after a certain number of sign-ins to the hands-free head-mounted wearable device. Specifically, a policy can be set that if a device fails to connect to a cloud implemented device check-in, a user can be prevented from authenticating the device until the device is connected to the check-in. Such a policy is advantageous because requiring devices to connect to a cloud-based check-in ensures that devices can be easily tracked. In this way, if a disgruntled employee "loses" a device and cannot "find it," the device can be rendered unusable and/or can be found when connecting to the check-in. Using authentication and such a check-in results in a hybrid local and cloud-based voice authentication system.

Figure 5:
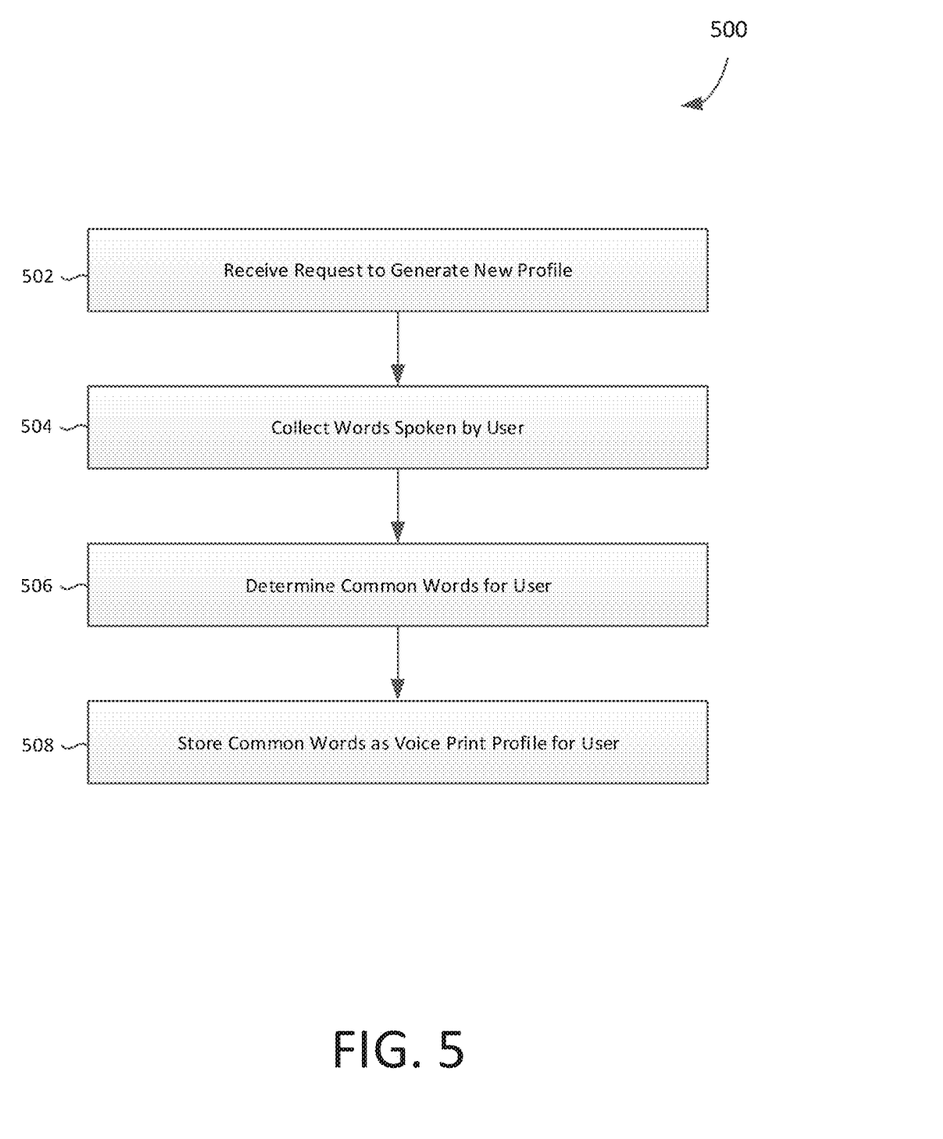
FIG. 5 depicts a process flow showing an embodiments of a method for registering a user with a voice authentication system, in accordance with embodiments of the present disclosure.

With reference to FIG. 5, a process flow is provided showing an embodiment of method 500 for registering a user with a voice authentication system, in accordance with embodiments of the present disclosure. The method 500 may be performed at least in part, for instance, by the voice authentication system 404 of FIG. 4. Each block or step of method 500 and other methods described herein can comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At block 502, a request to generate a new user voiceprint profile to register a user with a voice authentication system can be received. Such a request can be received by a voice authentication system operating solely on hands-free head-mounted wearable device. In other embodiments, such a request can be received by a voice authentication system operating in conjunction with a remote server (e.g., via the cloud). Such a user voiceprint profile can be based on a user's very common words. Very common words can generally be defined as words and/or phrases often uttered by a particular user. Voiceprint profiles of these very common words can be collected and stored. When performing ongoing secondary authentication, very common words spoken by the user of a device can be compared with a registered user voiceprint profile to determine whether the user of the device is the same user that initially logged into the device (e.g., by comparing frequency, duration, and amplitude). In further embodiments, the very common words spoken by the user of the device can be compared with one or more registered user voiceprint profiles for users authorized to utilize the device.

At block 504, words spoken by a user can be collected and stored. To generate a voiceprint profile, the headset can listen to a user interacting with the device. In listening, voice prints from a user can be collected. Such collection can occur during a single initial session and/or over time. For instance, a user can undergo registration during an initial use of the headset. In other embodiments, registration can be over several session to obtain a more personalized voiceprint profile. For instance, registration can continue until a certain amount of recording (e.g., five hours) has been collected. Collected voiceprints can include a recording of an entire user session with the device. Alternatively, or in addition, collected voiceprints can be random samplings from a user session(s).

At block 506, common words can be determined for a user. Very common words, or common words, can generally be defined as often used words and/or phrases by a particular user. Such words and/or phrases can relate to operation commands (e.g., keyword cues to touch-based control dialogue associations for controlling the hands-free head-mounted wearable device stored in keyword custom library 272) and/or any words and/or phrases a user says while wearing the device. In an embodiment, a user's very common words can be determined by analyzing collected voiceprints for a user and selecting a predetermined number of very common words to use as a profile for the user (e.g., top 10 most uttered words/phrases). For instance, a first user's very common words can include "job order" and "open documents," whereas a second user's very common words can include "navigate back" and "navigate home."

At block 508, upon determining very common words for a user, the very common words can be used to generate a user voiceprint profile that can be stored for the user. In some embodiments, a voiceprint profile can be designated for a particular hands-free head-mounted wearable device. Alternatively, a voiceprint profile can be designated for a particular user, allowing the user to log into any hands-free head-mounted wearable device. This voiceprint profile can be stored locally on a hands-free head-mounted wearable device and/or on a server in the cloud. Such a user voiceprint profile can be dynamically updated over time such that the very common words are constantly tailored to a particular user. Such dynamic updating can occur over at determined time instances such that the user voiceprint profile can be up-to-date as a user's work and/or use of the hands-free head-mounted wearable device changes over time.

Figure 6:
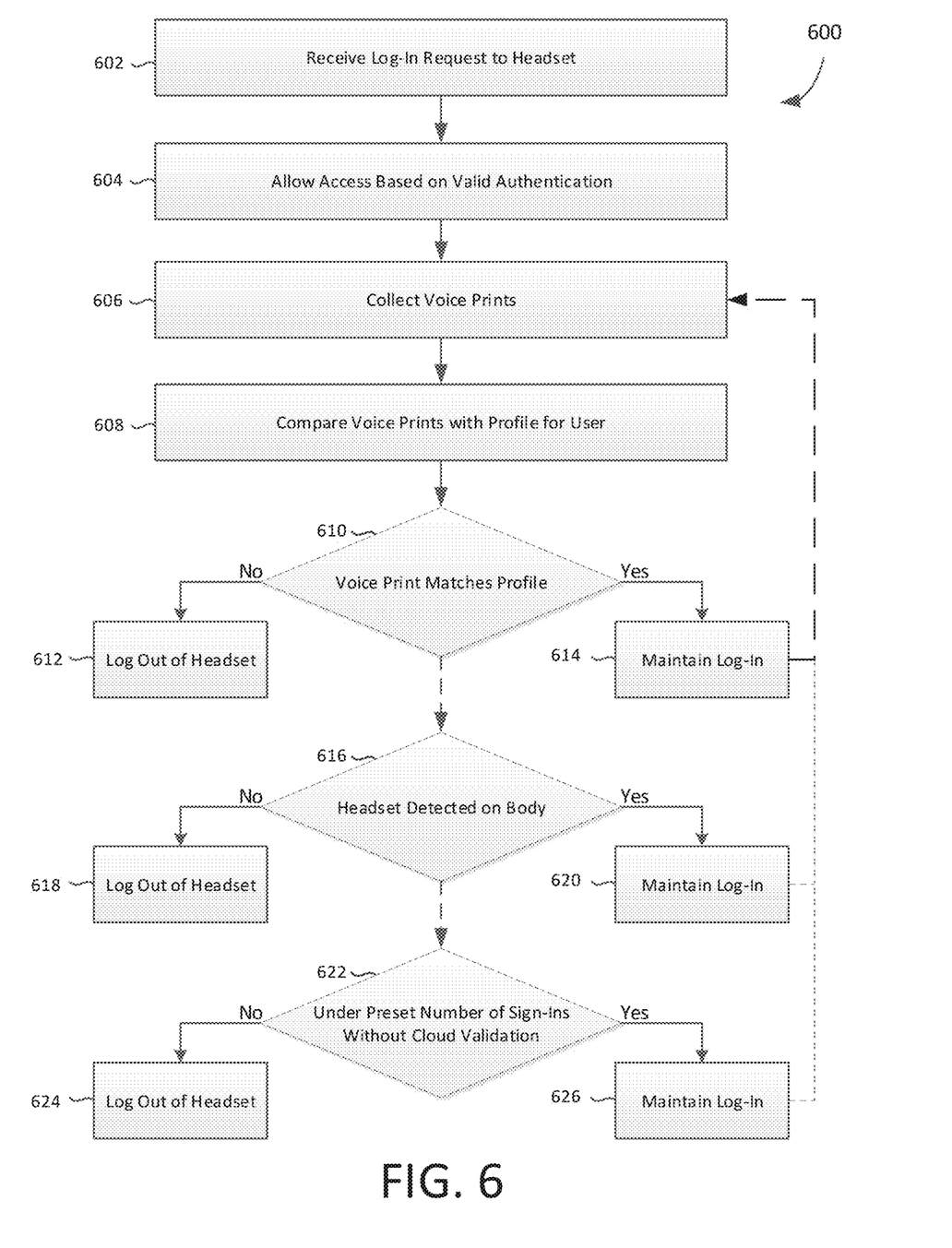
FIG. 6 depicts a process flow showing an embodiments of a method for authenticating a user using a voice authentication system, in accordance with embodiments of the present disclosure.

With reference to FIG. 6, a process flow is provided showing an embodiment of method 600 for authenticating a user using a voice authentication system, in accordance with embodiments of the present disclosure. The method 600 may be performed at least in part, for instance, by the head mount display 320 of FIG. 3. Each block or step of method 600 and other methods described herein can comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. Aspects of method 600 can be performed, for example, by authentication engine 412, as illustrated in FIG. 4.

Once a user is registered in a voice authentication system, the user is able to log into one or more hands-free head-mounted wearable devices. The voice authentication system can be used to perform an initial sign-in to a device, maintain the login of a user for the device, and/or utilize additional security features to ensure protection of the device over time.

At block 602, an initial log-in request to sign into a hands-free head-mounted wearable device can be received. At block 604, access can be allowed when valid authentication is determined. Initial authentication of a hands-free head-mounted wearable device can use any login technique that allows a user to gain access to device functionality. For instance, a display of the hands-free head-mounted wearable device can be presented to a user with words assigned to numbers. The user can the use the word associations to log into the device in using words matched up with the numbers of their PIN, ensuring a secure login. Another technique allows a user to speak a prompted phrase that is then matched with the user's enrolled profile. For instance, a user can be prompted to speak their full name and then the sound, cadence, etc. of the spoken name can be compared with the user's stored name profile.

At block 606, as a user utilizes a hands-free head-mounted wearable device, voiceprints can be collected. Collected voiceprints can include recordings of entire user sessions with the device. Alternatively, or in addition, collected voiceprints can be random samplings from a user session(s).

At block 608, collected voiceprints can be compared with a registered voiceprint profile for a user. This collection and comparison of voiceprints can be designated as a secondary authentication of a user. Secondary authentication can take place at designated time intervals after an initial sign-in to a device (e.g., every 15 minutes, every hour, every three hours, etc.). Advantageously, secondary authentication ensures that as a hands-free head-mounted wearable device is used for extended periods of time, the individual using the device is the same user that performed the initial authentication. Alternatively, the secondary authentication can ensure that if a new individual is using the device, the new individual is authorized to use the device based. For instance, when a user's very common words in the registered user voiceprint profile include "job order", "gotta get going", "open documents", "navigate back", and "navigate home" and the user of the device continues to use these phrases, the maintenance component can allow the secondary authentication. Such a comparison can be based on a frequency of use of the very common words. Such a comparison can also be based on an evaluation of a very common word uttered by the user of a device and a corresponding very common word stored in a user voiceprint profile. Such an evaluation can be based on an analysis of frequency, duration, and amplitude.

At block 610, if the collected voiceprint(s) for very common word(s) does not match a user voiceprint profile, at block 612, the user is logged out of the headset. At block 610, if the collected voiceprint(s) for very common word(s) matches a user voiceprint profile, at block 614, the user remains logged into the headset and authentication is maintained. As the secondary authentication is ongoing, the method can return to block 606 and additional voiceprints can be collected such that authentication continues periodically at predefined intervals (e.g., every 15 minutes, every hour, every three hours, etc.).

Additional security measures can be implemented at block 616 and/or 622. Advantageously, adding security measures can create another layer of protection beyond voice authentication. Such security measures can be executed using policies that can be adjusted based on needs. For instance, security measures in one working environment can differ from another working environment which can differ from a home environment or public environment.

At block 616, a determination can be made whether the hands-free head-mounted wearable device is detected to be on the body of a user. At block 618, if the device is determined to not be detected on a user's body, at block 616, the user is logged out of the headset. At block 616, if the is detected to be on a user's body, at block 620, the user remains logged into the headset and authentication is maintained. This detection can be determined using sensors of the device such that if the device remains still for an amount of time, a determination is made that the device is not on the body of a user.

At block 622, a determination can be made the number of sign-ins of a device without cloud validation (e.g., device check-in) are under a preset number. A security policy can be set for a device that access using a user's voiceprint profile can expire after a certain number of sign-ins to the hands-free head-mounted wearable device. Specifically, the policy can be set such that when a device fails to connect to a cloud implemented device check-in, a user can be prevented from authenticating the device until the device is connected to the check-in. Such a policy is advantageous because requiring devices to connect to a cloud-based check-in ensures that devices can be easily tracked. Using authentication and such a check-in results in a hybrid local and cloud-based voice authentication system. At block 622, if the device is determined to exceed a preset number of sign-ins without cloud validation, at block 624, the user is logged out of the headset. At block 622, if the device is determined to not exceed a preset number of sign-ins without cloud validation, at block 626, the user remains logged into the headset and authentication is maintained. In practice, blocks 622-626 can be performed concurrently to an initial login request from a user (e.g., concurrently with blocks 602-604). In other embodiments, blocks 622-626 can be performed subsequent to initial login request from a user.

Figure 7:
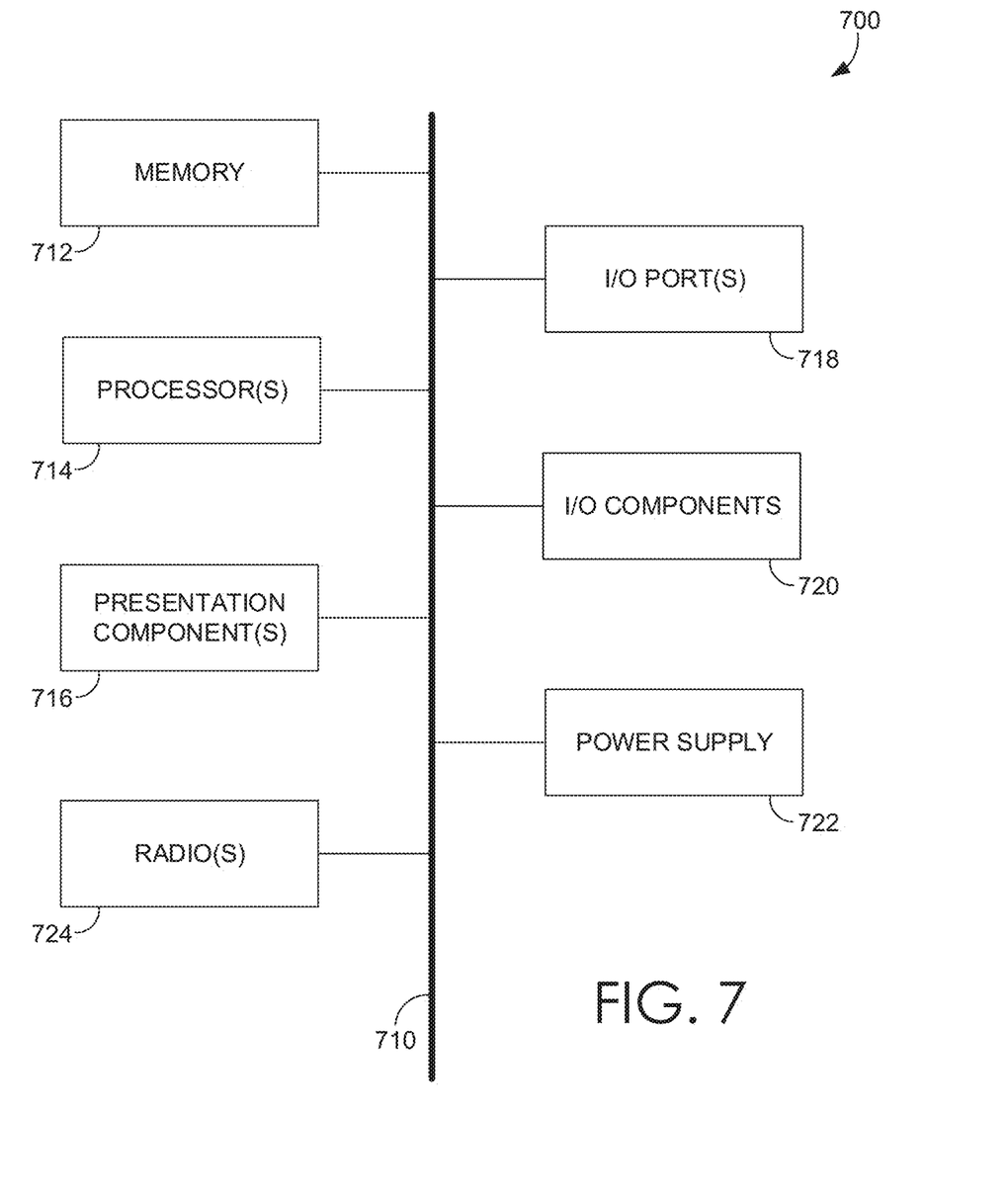
FIG. 7 is a block diagram of an exemplary computing environment suitable for use in accordance with some implementations of the present disclosure.

Having described various embodiments of the invention, an exemplary computing environment suitable for implementing embodiments of the invention is now described. With reference to FIG. 7, an exemplary computing device is provided and referred to generally as computing device 700. The computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A non-transitory computer storage medium storing computer-useable instructions that, when used by one or more computing devices, cause the one or more computing devices to perform operations comprising:

receiving a request to register a user in a voice authentication system, wherein registration generates a user voiceprint profile;

based on receipt of the request, collecting voiceprints of words uttered by the user during a plurality of sessions;

determining a set of words most-frequently uttered by the user based on the collected voiceprints of words uttered by the user during the plurality of sessions;

generating the user voiceprint profile comprised of one or more voiceprints of the collected voiceprints associated with the set of most-frequently uttered words, wherein the user voiceprint profile is utilized for an ongoing secondary authentication process that compares the user voiceprint profile to additional voiceprints collected during a previously-authenticated session of a hands-free head mounted wearable device in order to maintain the previously-authenticated session;

after the user voiceprint profile is generated, collecting further voiceprints of words uttered by the user during one or more additional sessions;

determining an updated set of words most-frequently uttered by the user based on the collected voiceprints of words and the collected further voiceprints of words; and updating the user voiceprint profile with the updated set of most-frequently uttered words.

2. The medium of claim 1, wherein the user voiceprint profile is compared to the additional voiceprints based on at least one of a frequency, a duration, and an amplitude of the additional voiceprints and the one or more voiceprints of the collected voiceprints associated with the set of most-frequently uttered words.

3. The medium of claim 1, wherein generating the user voiceprint profile further comprises selecting a predefined number of the set of most-frequently uttered words to store in the user voiceprint profile.

4. The medium of claim 1, the operations further comprising:

associating the user voiceprint profile with one or more authorized hands-free head-mounted wearable devices, wherein the user voiceprint profile allows the user to authenticate the one more authorized hands-free head-mounted wearable devices during use based on the ongoing secondary authentication process.

5. The medium of claim 1, the operations further comprising:

associating the user voiceprint profile with the user, wherein the user voiceprint profile allows the user to authenticate one more authorized hands-free head-mounted wearable devices during use based on the ongoing secondary authentication process.

6. A computer-implemented method, the method comprising:

obtaining a plurality of voiceprints for a user having authenticated access to a hands-free head mounted wearable device, the plurality of voiceprints corresponding to words uttered by the authenticated user and collected over a plurality of sessions, wherein the authenticated access is based on a PIN;

determining a set of words most-frequently uttered by the authenticated user based on the plurality of voiceprints;

generating a user voiceprint profile based on the set of most-frequently uttered words, the user voiceprint profile including a portion of the plurality of voiceprints corresponding to the set of most-frequently uttered words, wherein the user voiceprint profile is utilized for an ongoing secondary authentication process that compares the user voiceprint profile to additional voiceprints collected during another authenticated session of a hands-free head mounted wearable device in order to maintain the other authenticated session;

after the user voiceprint profile is generated, collecting further voiceprints of words uttered by the authenticated user during one or more additional sessions;

determining an updated set of words most-frequently uttered by the authenticated user based on the set of most-frequently uttered words and the collected further voiceprints of words; and updating the user voiceprint profile with the updated set of most-frequently uttered words.

7. The method of claim 6, wherein the ongoing secondary authentication process is performed periodically at predefined intervals during the new authenticated session.

8. The method of claim 6, further comprising:
terminating the other authenticated session when the additional voiceprints fail to match to the user voiceprint profile.

9. The method of claim 6, further comprising:
determining, using a sensor of the hands-free head-mounted wearable device, that the hands-free head-mounted wearable device is separate from the user's body; and
terminating the other session of the hands-free head-mounted wearable device based on the determination that the hands-free head-mounted wearable device is separate from the user's body.

10. The method of claim 6, further comprising:
terminating the other session based on a determination that a number of times a cloud implemented device is inaccessible exceeds a preset number.

11. The method of claim 6, wherein the user voiceprint profile is for the user having the authenticated access.

12. A computerized system comprising:
one or more processors; and
one or more computer storage media storing computer-usable instructions that, when used by the one or more processors, cause the one or more processors to:
collect voiceprints of words uttered by a user, via a microphone, during a session of a hands-free head-mounted wearable device, wherein the session is authenticated based on a PIN of the user;
compare the voiceprints with another set of voiceprints corresponding to a set of words determined to be most-frequently uttered by the user during a plurality of sessions previously-authenticated based on the PIN, the other set of voiceprints being stored in a user voiceprint profile for the user and utilized to perform a secondary authentication that maintains the session;
determine an updated set of words most-frequently uttered by the user based on the most-frequently uttered set of words and the other set of voiceprints; and
update the user voiceprint profile with the updated set of most-frequently uttered words.

13. The computer system of claim 12, wherein the most-frequently uttered set of words includes a preset number of words.

14. The computer system of claim 12, wherein the comparison of voiceprints includes an analysis of at least one of a frequency, a duration, and an amplitude of the voiceprints and the other set of voiceprints.

15. The computer system of claim 12, further causing the one or more processors to:
determine a number of times a cloud-implemented authentication device is inaccessible from the hands-free head-mounted wearable device, and
based on determining that the number of times the cloud-implemented authentication device is inaccessible exceeds a preset number, terminate the session of the hands-free head-mounted wearable device.

* * * * *